US010650694B2

(12) United States Patent
Rozenberg (10) Patent No.: US 10,650,694 B2
(45) Date of Patent: May 12, 2020

(54) UNMANNED VEHICLE SIMULATOR

(71) Applicant: ISRAEL AEROSPACE INDUSTRIES LTD., Lod (IL)

(72) Inventor: Ohad Rozenberg, Yad Binyamin (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 291 days.

(21) Appl. No.: 15/746,259

(22) PCT Filed: Jul. 24, 2016

(86) PCT No.: PCT/IL2016/050807
§ 371 (c)(1),
(2) Date: Jan. 19, 2018

(87) PCT Pub. No.: WO2017/025948
PCT Pub. Date: Feb. 16, 2017

(65) Prior Publication Data
US 2018/0233061 A1 Aug. 16, 2018

(30) Foreign Application Priority Data

Aug. 10, 2015 (IL) .......................................... 240461

(51) Int. Cl.
*G09B 9/02* (2006.01)
*G09B 9/48* (2006.01)
(Continued)

(52) U.S. Cl.
CPC ................. *G09B 9/02* (2013.01); *G09B 9/00* (2013.01); *G09B 9/003* (2013.01); *G09B 9/085* (2013.01);
(Continued)

(58) Field of Classification Search
None
See application file for complete search history.

(56) References Cited

U.S. PATENT DOCUMENTS 6,146,143 A * 11/2000 Huston .................... G09B 9/05
345/620
8,229,163 B2 7/2012 Coleman et al.
(Continued)

FOREIGN PATENT DOCUMENTS

DE 102009051644 A1 5/2011
WO 2011051501 A2 5/2011

OTHER PUBLICATIONS

International Search Report for International Application No. PCT/IL2016/050807 dated Nov. 13, 2016.

*Primary Examiner* — Jason T Yen
(74) *Attorney, Agent, or Firm* — Dorsey & Whitney LLP (57) ABSTRACT

The presently disclosed subject matter includes a Ux V system simulator. According to some examples synthetic images are display on the display device, the synthetic images showing an artificial representation of an environment in which operation of a Ux V is being simulated, the images are shown as if viewed from a vantage point of an imaging payload located onboard the Ux V; the images are processed to extract thereform values of one or more graphic image parameters; responsive to a command issued with respect to the synthetic images, the extracted values are compared with respective predefined reference values; A simulation of the issued command is executed only if the comparison between the extracted values and respective reference values complies with at least one predefined condition, thereby increasing similarity between the operation of the simulator and the operation of the real UAV system being simulated.

19 Claims, 4 Drawing Sheets

(51) Int. Cl.
*G09B 9/30* (2006.01)
*G09B 9/00* (2006.01)
*G09B 9/12* (2006.01)
*G09B 9/08* (2006.01)

(52) U.S. Cl.
CPC ............... *G09B 9/12* (2013.01); *G09B 9/30* (2013.01); *G09B 9/48* (2013.01); *G09B 9/302* (2013.01)

(56) References Cited

U.S. PATENT DOCUMENTS

| | | | |
|---|---|---|---|
| 2010/0003652 A1 | 1/2010 | Lavie et al. | |
| 2011/0301925 A1* | 12/2011 | McWilliams, III | G09B 9/08 703/6 |
| 2015/0104757 A1* | 4/2015 | Moncrief | G09B 9/302 434/38 |

* cited by examiner

Fig. 1

Prior Art

UNMANNED VEHICLE SIMULATOR

FIELD OF THE PRESENTLY DISCLOSED SUBJECT MATTER

The presently disclosed subject matter relates to the field of simulators of unmanned vehicle systems.

BACKGROUND

Unmanned vehicles (UxVs), which are predominantly used for military and special operation applications, are becoming today increasingly popular in civilian applications. Various types of UxVs and unmanned aerial vehicles (UAVs) in particular, are used in a large variety of applications including for example, traffic monitoring, remote sensing and reconnaissance, transportation, search and rescue, domestic policing, electronic warfare and decoys, border patrol and more.

Operating an UxV system is often a complicated task which requires highly trained operators. UxV system simulators are platforms which are used for training operators to monitor and control the operation of an unmanned vehicle and/or one or more onboard payloads. UxV system simulators provide an artificial representation of an environment which mimics the true operational environment of a real UxV system. Training with a simulator rather than an actual UxV system allows UxV operators to train while reducing training costs as well as the risks typically involved in the operation of an actual UxV.

GENERAL DESCRIPTION

According to an aspect of the presently disclosed subject matter there is provided a UxV system simulator of a real UxV system comprising a sensing unit operating onboard a UxV configured to communicate over a communication link with a control unit; the simulator comprising:

a computer processing device operatively connected to a display device, the processing device being configured to:

display synthetic images on the display device, the synthetic images showing an artificial representation of an environment in which operation of a UxV is being simulated, the images are shown as if viewed from a vantage point of an imaging payload located onboard the UxV; process the synthetic images to extract therefrom values of one or more graphic image parameters; responsive to a command issued with respect to the synthetic images, comparing the extracted values with respective predefined reference values; the reference values are graphic image parameters values extracted from synthetic images which provide an indication with respect to the synthetic images, as to whether or not the simulator, when simulating a certain sensing unit, is capable of executing the command;

and execute a simulation of the issued command only if the comparison between the extracted values and respective reference values complies with at least one predefined condition, thereby increasing similarity between the operation of the simulator and the operation of the real UAV system being simulated.

In addition to the above features, the simulator according to this aspect of the presently disclosed subject matter can optionally comprise one or more of features (i) to (ix) below, in any desired combination or permutation:

i. wherein the simulator is further configured to: determine whether to allow execution of the command based also on virtual data which defines the physical characteristics of the synthetic images.

ii. wherein the simulator is further configured to adapt the predefined reference values according to performance capabilities of the real sensing unit in order to realistically simulate the operation of the real sensing unit.

iii. wherein the simulator is further configured to adapt the predefined reference values according to performance capabilities of another real sensing unit which is characterized by performance capability which is different than the real sensing unit, in order to realistically simulate the operation of the other sensing unit.

iv. wherein the simulator is further configured to adapt the predefined reference values to match malfunctioning performance of the real sensing unit in order to simulate a defective UxV system.

v. wherein the command is directed for tracking a target displayed in the synthetic images.

vi. wherein the graphic image parameter values include one or more of:

contrast value indicating the difference between the target and the background image; color values; differences in various graphic image parameters characterizing the same objects in different images along a succession of images; products of edge detection; and products of image segmentation.

vii. wherein the simulator is further configured to: generate synthetic images based on virtual data which defines the physical inertial characteristics of the synthetic images.

viii. wherein the UxV is a Unmanned Arial Vehicle.

Wherein the reference values are graphic image parameter values extracted from synthetic images, which visually resemble real world images generated by the sensing unit operating in the real UxV system, where the real UxV system would have been capable of executing the command had it been given while processing the real world images.

ix. and which would have been able to execute the issued command

According to another aspect of the presently disclosed subject matter there is provided a computerized method of simulating a real UxV system comprising a sensing unit operating onboard a UxV configured to communicate over a communication link with a control unit, the method comprising:

using a computer processing device operatively connected to a display device for: displaying synthetic images on the display device, the synthetic images showing an artificial representation of an environment in which operation of a UxV is being simulated, the images are shown as if viewed from a vantage point of an imaging payload located onboard the UxV; processing the synthetic images to extract therefrom values of one or more graphic image parameters; and responsive to a command issued with respect to the synthetic images, comparing the extracted values with respective predefined reference values; the reference values are graphic image parameter values extracted from synthetic images which provide an indication with respect to the synthetic images, as to whether or not the simulator, when simulating a certain sensing unit, is capable of executing the command; and executing a simulation of the issued command only if the comparison between the extracted values and respective reference values complies with at least one predefined condition, thereby increasing similarity between the simulation and the operation of the real UAV system being simulated.

According to yet another aspect of the presently disclosed subject matter there is provided a computer-readable non-transitory memory device tangibly embodying a program of instructions executable by the computer for executing a method of simulating a real UxV system comprising a sensing unit operating onboard a UxV configured to communicate over a communication link with a control unit, the method comprising:

using a computer processing device operatively connected to a display device for:

displaying synthetic images on the display device, the synthetic images showing an artificial representation of an environment in which operation of a UxV is being simulated, the images are shown as if viewed from a vantage point of an imaging payload located onboard the UxV;

processing the synthetic images to extract thereform values of one or more graphic image parameters; and responsive to a command issued with respect to the synthetic images, comparing the extracted values with respective predefined reference values; the reference values are graphic image parameter values extracted from synthetic images which visually resemble real world images in which the sensing unit operating in the real UxV system would have been able to execute the issued command; and executing a simulation of the issued command only if the comparison between the extracted values and respective reference values complies with at least one predefined condition, thereby increasing similarity between the simulation and the operation of the real UAV system being simulated.

The method and the computer-readable non-transitory memory device, disclosed in accordance with the presently disclosed subject matter can optionally comprise one or more of features (i) to (ix) listed above, mutatis mutandis, in any desired combination or permutation.

BRIEF DESCRIPTION OF THE DRAWINGS

In order to understand the claimed subject matter and to see how it may be carried out in practice, various embodiments will now be described, by way of non-limiting example only, with reference to the accompanying drawings, in which:

DETAILED DESCRIPTION OF EMBODIMENTS

Unless specifically stated otherwise, as apparent from the following discussions, it is appreciated that throughout the specification discussions utilizing terms such as "using", "displaying", "processing", "comparing", "executing" or the like, include actions and/or processes of a computerized device that manipulate and/or transform data into other data, said data represented as physical quantities, e.g. such as electronic quantities, and/or said data representing physical objects.

Figure 2:
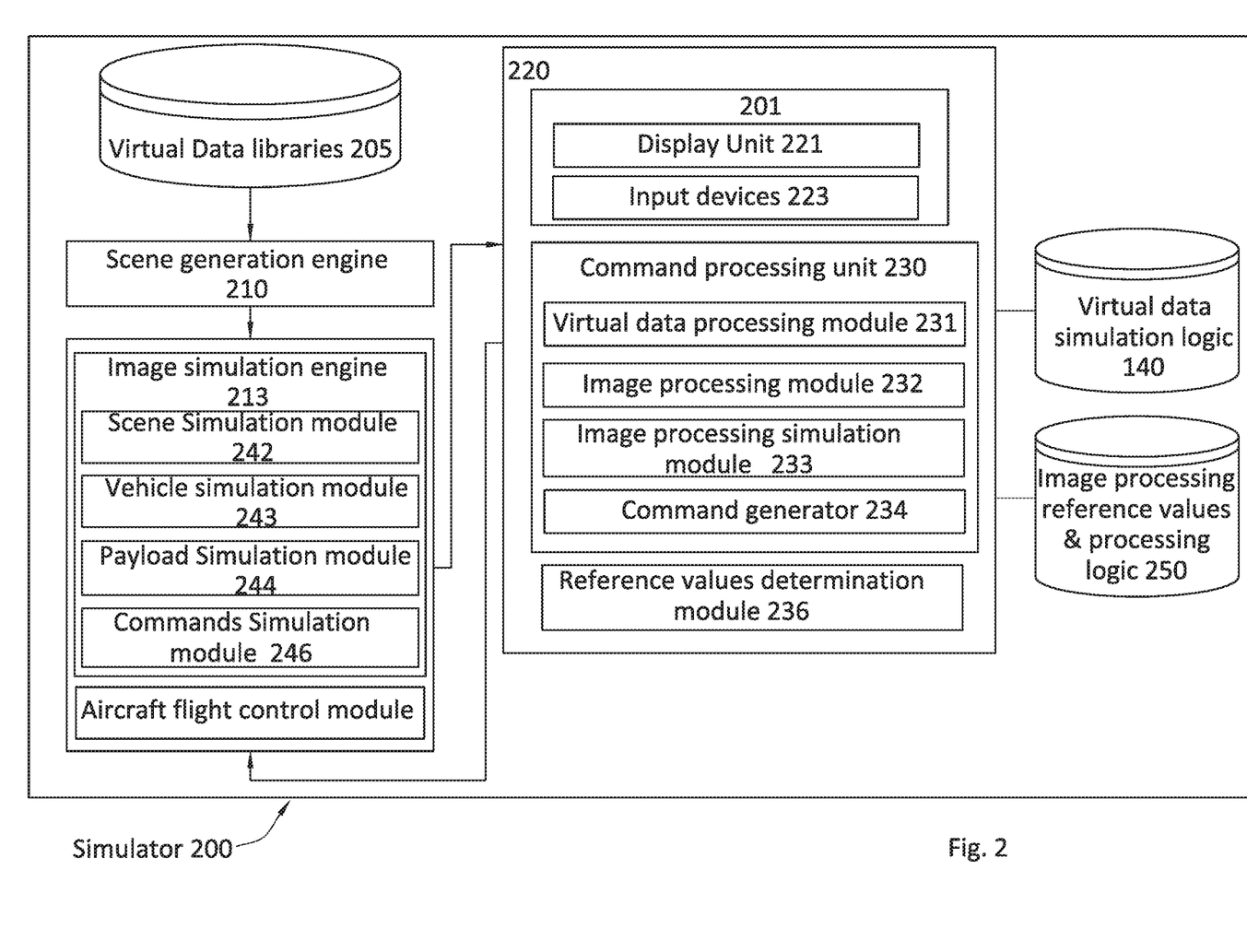
FIG. 2 is a functional block diagram of UAV system simulator, in accordance with an example of the presently disclosed subject matter.

Simulator 200 described below with reference to FIG. 2 is a computerized device. The terms "computerized device", "computer", "processing unit" or any other variation thereof should be expansively construed to cover any kind of electronic device with data processing capabilities, such as a processor (e.g. digital signal processor (DSP), microcontroller, field programmable circuit (ASIC), etc) or a device which comprises or is operatively connected to one or more computer processors including by way of non-limiting example, a personal computer, server, laptop computer, computing system, a communication device and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the claimed subject matter, which are, for clarity, described in the context of separate embodiments, may also be provided in combination in a single embodiment. Conversely, various features of the invention, which are, for brevity, described in the context of a single embodiment, may also be provided separately or in any suitable sub-combination. While the invention has been shown and described with respect to particular embodiments, it is not thus limited. Numerous modifications, changes and improvements within the scope of the claimed subject matter will now occur to the reader.

Figure 3:
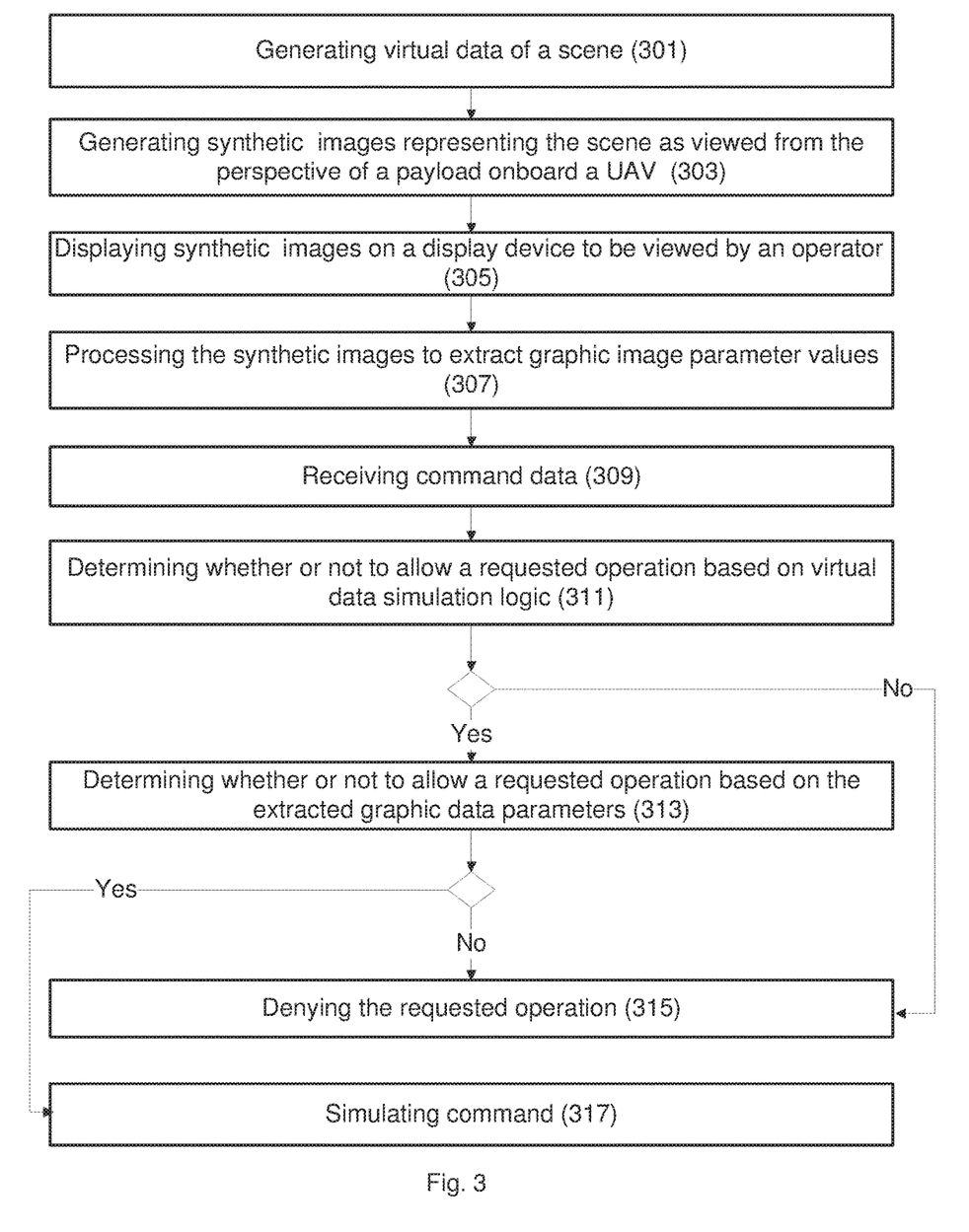
FIG. 3 is a flowchart illustrating an example of a sequence of operations performed, in accordance with an example of the presently disclosed subject matter.
Figure 4:
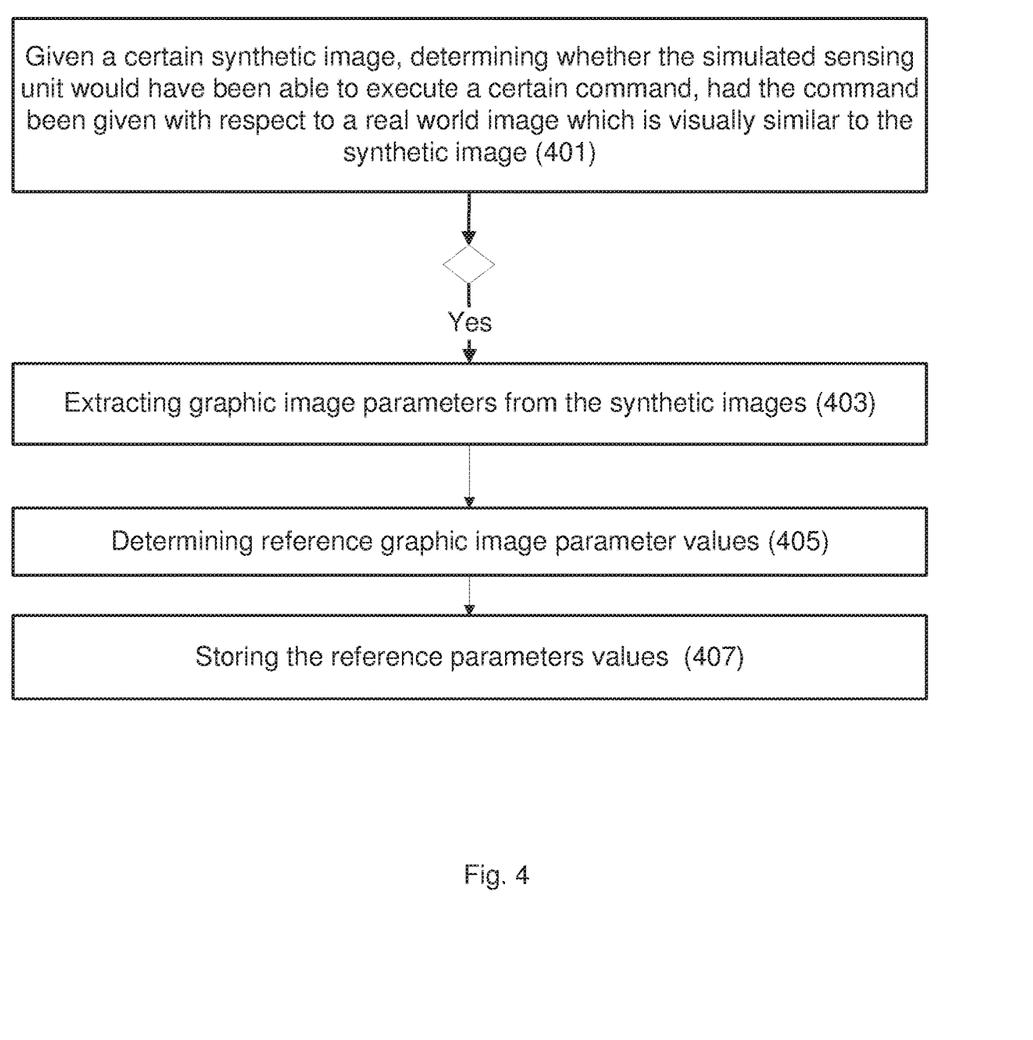
FIG. 4 is a flowchart illustrating an example of a sequence of operations performed for the purpose of determining graphic image parameter reference values, in accordance with an example of the presently disclosed subject matter.

In embodiments of the claimed subject matter, fewer, more and/or different stages than those shown in FIGS. 3 and 4 may be executed. In embodiments of the claimed subject matter, one or more stages illustrated in FIGS. 3 and 4 may be executed in a different order and/or one or more groups of stages may be executed simultaneously. For example, in some examples the order of the operations described with reference to blocks 311 and 313 can be changed where block 313 is performed before block 311. Alternatively, both blocks 311 and 313 can be executed substantially simultaneously.

FIG. 2 illustrates a schematic of the system functional architecture in accordance with embodiments of the presently disclosed subject matter. Functional elements in FIG. 2 may be centralized in one location or dispersed over more than one location. For example, data repository 250 can located at a location remote to control unit simulator 220 and communicate with control unit simulator 220 over a long distance communication infrastructure. The specific design of functional elements as shown in the FIG. 2 is merely a non-limiting example and should not be construed as limiting. Other designs which provide similar functionality should be considered within the scope of the subject matter disclosed herein. For example command simulation module illustrated in FIG. 2 as part of image simulation engine 213 can be otherwise implemented as part of command processing unit 230. According to other examples, the disclosed system may comprise fewer, more and/or different modules than those shown in FIG. 2.

It is noted that while for simplicity the description set forth herein mainly pertains to UAVs, this is done by way of a non-limiting example only and the principles disclosed with respect to UAVs can be similarly implemented in simulators of other types of unmanned vehicles (UxVs), including, for example, unmanned marine vehicles, unmanned ground vehicles, unmanned submarine vehicles, etc.

Figure 1:
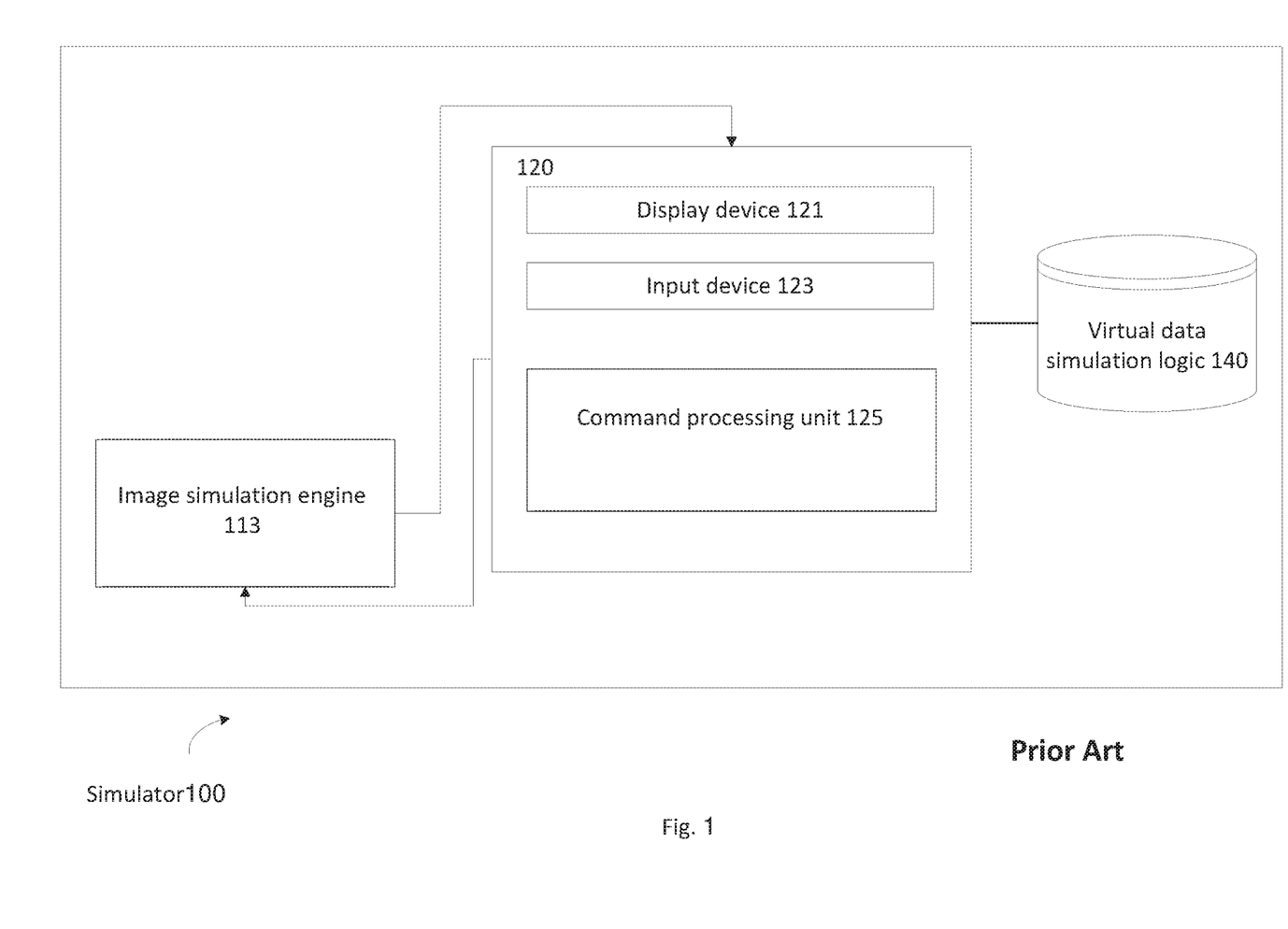
FIG. 1 is a functional block diagram of UAV system simulator, in accordance with the prior art.

Bearing the above in mind, attention is now drawn to FIG. 1 showing a functional block diagram illustrating a UAV system simulator, according to the prior art. In general, real UAV systems comprise a sensing unit onboard a UAV which communicates over a communication link with a control unit. UAVs which are used for surveillance missions carry a sensing unit, comprising some type of imaging payload, which can be used for surveying a scene and generating sensing-data (including images acquired by the imaging payload). The generated sensing-data is transmitted over the communication link to the control unit, where it is displayed on a display device to be viewed by an operator. The imaging payload can be for example some type of an electro-optic sensor which can provide for example, color optical images, black and white optical images, as well as infra-red images.

Control-data generated at the control unit is transmitted to the sensing unit. The control-data includes different types of commands issued by an operator of the control unit, such as lock and track commands, zoom commands, centering commands, etc. The sensing unit attempts to execute the commands which are received from the control unit. For example, responsive to a lock and track command, a tracker device (comprising a tracker circuit board) in the sensing unit can generate instructions to an imaging payload for locating, locking and tracking a sighted object of interest (target).

Many UAV system simulators (referred to hereinbelow in short also as "simulator") use synthetic images generated in order to simulate the operation of the sensing unit onboard the UAV. The synthetic images provide an artificial representation of the environment in which the UAV is operating. The synthetic images are intended to mimic the data which is normally generated by the sensing unit while surveying an area or tracking a target.

Simulator 100 in FIG. 1 comprises an image simulation engine 113 configured for generating synthetic images of an artificial environment in which the UAV is operating. The synthetic images include images generated as if taken from a vantage point of a sensing unit onboard the UAV. The synthetic images are displayed on a display device to be presented to the operator and simulate the operation of a control unit communicating with a sensing unit onboard a UAV. As explained below in more detail, synthetic images are generated based on virtual data which includes information logically representing the physical and inertial characteristics of a simulated environment. The virtual data is transformed into graphic representation displayed in the synthetic images.

In order to further simulate the operation of the control unit, existing simulators further comprise control unit simulator 120 for simulating a control unit and providing a platform for interaction of the operator with the UAV system. The training operator can view the displayed synthetic images and use one or more input devices 121 (e.g. keyboard, joystick and mouse) to issue various commands for controlling the UAV and/or the sensing unit. Control unit simulator is configured to initiate the simulation of the execution of issued commands.

Simulator 100 comprises a command processing unit 125 configured to process issued commands. The issued commands are processed and executed in a manner which strives to resemble the execution of commands by a real sensing unit, where the commands are issued with respect to real world images generated by the sensing unit in a UAV while actually flying in the sky and monitoring a surveyed area.

For example, responsive to a lock and track command issued with respect to a sighted target, command processing unit 125 is configured to mimic the operation of sensing unit and thus identify the selected target in the synthetic images, and track the target along a succession of synthesized images (synthesized video stream). Simulation of this procedure is made to include various features which normally characterize the real world scenario it aims to mimic. For example, the simulation may include a communication link time delay which is often present when communicating data over a long distance data link such as the one linking the UAV and the control unit.

Command processing unit 125 can be configured to generate graphical indications of the command execution. For example, command processing unit 125 can be configured to add an indicator (e.g. cross or rectangle) which marks the target on the displayed images as it is being tracked.

Simulator 100 can be implemented as a hardware based simulator in which case command processing unit 125 comprises an actual tracker device converted to operate as part of simulator 100. The tracker device (and specifically the tracker circuit board therein) is adapted to execute incoming commands issued with respect to synthetic images rather than real world images.

A hardware based simulator is characterized by a high price tag. In addition, as further explained below, the processing of synthetic images by the tracker device does not necessarily provide the same results as the processing of real world images and therefore it is difficult to obtain the desired realistic simulation.

According to another example, simulator 100 can be implemented as a software based simulator in which case command processing unit 125 can be implemented as a software based processing unit (without using a real tracker device) comprising a set of instructions executable by a computer processor and configured to execute the issued commands. The software based processing unit strives to mimic the operation of the actual tracker device.

While software based simulators may have a lower price tag as compared to hardware based simulators, it is a very complicated task to successfully design a software based simulator which realistically mimics the operation of the tracker device of a respective sensing unit which is desired to be simulated.

Other types of simulators operate based on the virtual data alone (i.e. virtual data based simulators), which is processed to determine whether and how an issued command can be executed. While these types of simulators have the physical and inertial information, they lack information about the image itself, which reflects on the quality of the simulation they provide.

In real world operation of a UAV system, successful execution of a received command depends on the objective environmental conditions and on the performance capabilities of the specific sensing unit.

For example, execution of a lock and track command requires a clear line of sight between the sensing unit and the object of interest. This depends on objective environmental conditions related to the location of the UAV and imaging payload relative to the location of the target. If the line of sight between the sensing unit and the target is blocked (e.g. by objects such as buildings, mountains or trees) execution of the command is likely to fail. If, however, the line of sight between the sensing unit and the object of interest is partially blocked, or if sight of the target is obscured for some reason, successful execution of the command depends also on the performance capabilities of the specific sensing unit (and particularly on the performance of the tracker device) which is being used.

Consider for example a scenario where the line of sight between the sensing unit and the target is obscured by clouds or fog. In such a case, successful execution of the tracking command depends also on how well the sensing unit can identify and keep track of the target within the clouds or fog. As different sensing units have different performance capabilities (inter alia due to the fact that they are equipped with different tracker devices) successful execution in such scenarios depends on the specific type of sensing unit which is being used.

Another example of a characteristic of the performance capability of a sensing unit is related to a contrast (which can be defined as a color histogram distribution) between the target and the surrounding background in a captured image. A tracking device is capable of responding to a lock and track command if there is sufficient contrast between the target and the background which enables the sensing unit to identify and track the object. This contrast needed for identifying a target in an image may vary between different sensing units (depending on the hardware and software which is used).

The requirement, of certain performance capabilities (e.g. a certain contrast value) is not an explicit requirement of the sensing unit but rather an implicit requirement which is apparent from the actual performance of the specific sensing unit and/or tracker.

As mentioned above, simulators often use synthetic images which artificially represent a surveyed environment. However, synthetic images are usually different than real world images (i.e. images captured by an imaging payload operating onboard an actual UAV in a real world environment). Synthetic images many times lack important details which can be found in real world images. The information missing from the synthetic images, may be utilized, when available, by a sensing unit during the processing of real world images to identify objects (e.g. targets) in the captured images and to execute various commands with respect to the identified object e.g. track a target along a succession of captured images.

For example, information which may be missing from synthetic images as opposed to real world images includes texture dynamic range and color dynamic range. When synthesizing the images, the image simulation engine may not provide images with color dynamic range which is as large as the one found in real world images. Likewise, the synthesized texture dynamic range may be smaller than that of real world images.

Whether it is a hardware based simulator, a software based simulator or virtual data based simulator, due to the difference between the information available in synthetic images as compared to real world images, the simulator operating on synthetic images is likely to provide different results than the results attained when processing real world images. Thus, the simulator may not provide the desired realistic training experience.

Furthermore, as explained above, different sensing units (equipped with different tracking devices) may operate differently, and therefore a simulator designed to simulate the operation of one sensing unit may not be suitable for simulating the operation of another sensing unit. Thus, a dedicated simulator may be needed for simulating different sensing units.

The presently disclosed subject matter includes a simulator and a computerized method of operating thereof. The disclosed simulator and method enable to adapt its operation to resemble the operation of a specific sensing unit operating under real world conditions and processing real world images and thus improve the realism of the training experience. Furthermore, the disclosed simulator and method can be used for simulating different sensing units.

FIG. 2 is a functional block diagram illustrating a UAV system simulator, according to examples of the presently disclosed subject matter. Simulator 200 comprises scene generation engine 210 being operatively connected to virtual data libraries 105. Scene generation engine 210 is configured to generate a virtual representation of a scene. Virtual information representing the various characteristics of the scene can be retrieved from virtual data libraries 205. Such characteristics include for example, environmental features such as time of day, season of the year, clouds, fog, sun, wind etc.; geographical features such as mountains, valleys, forests, costs, lakes, rivers, etc.; land cover features such as roads, buildings, houses, airports, playing grounds, soccer fields, water towers; various objects such as, cars, aircrafts, people, signs, traffic lights, etc.

Image simulation engine 213 is configured to graphically model (e.g. 3D model) the virtual data of a particular scene and generate a succession of synthetic images graphically representing an artificial environment in which the UAV is operating. As mentioned above, the synthetic images are generated as if taken from a vantage point (point of view) of one or more imaging payloads onboard the UAV.

According to one example, image simulation engine 113 can comprise a number of simulation modules, each dedicated for generating the graphical representation of certain types of virtual data. For example, scene simulation module 242 can be configured to generate the graphical representation of the entire area which is being surveyed by the sensing unit; payload simulation module 244 can be configured to generate the synthetic images, from the point of view of the imaging payload; tracker simulation module 246 generates synthetic images simulating the operation of tracker i.e. tracking a sighted target responsive to an issued lock and track command. Vehicle simulation module 243 can be configured to simulate the position and orientation (in 6 degrees of freedom) of the UAV with respect to the simulated environment. Aircraft flight control module is configured to simulate the controls over the operation of various aerial control devices, such as stabilizers, ailerons and rudders, for maneuvering the UAV from along a desired flight course. Simulator 200 can be configured to simulate an autonomous flight mode where the UAV autonomously controls the flight course, or, alternatively, to simulate operator controlled flight mode, where the training operator is in charge of controlling the UAV flight.

Synthetic images are transmitted to control unit simulator 220 comprising a display device where the images are displayed to be viewed by an operator. Control unit simulator 220 further comprises input device(s) 123, which can include for example, one or more of: joystick; computer mouse; keyboard; touch pad; touch screen; or any other device enabling operator-interaction with control unit simulator 220.

An operator of simulator 200 views the displayed images and can issue various commands. The commands are executed by the simulator 200 in a manner which realistically resembles the operation of an actual UAV system.

According to the presently disclosed subject matter commands which are issued by the operator are processed by command processing unit 230, which is configured, inter alia, to process the command and determine whether or not to allow the execution of the requested command. This determination is made in order to emulate the performance of the simulated UAV system, thus, a command is allowed in case the simulated sensing unit would have been able to execute the same command issued in similar real world conditions.

Determination is based on the relevant virtual data which includes information logically representing the physical and inertial characteristics in the scene at the time the command is issued. For example, assuming the operator issues a lock and track command for tracking an object of interest in the scene, virtual data is used to determine whether there is a clear line of sight between the virtual imaging payload and the target indicated in the lock and track command.

To this end, command processing unit 230 can comprise, for example, virtual data processing module 231 configured to process issued commands based on the relevant virtual data (including virtual data providing the logical representation of the currently displayed synthetic images). The processing of the relevant virtual data is performed using virtual data simulation logic defining the rules for determining whether an issued command can be executed or not based on the relevant virtual data. Virtual data simulation logic can be stored in a data repository operatively (140) connected to control unit simulator 220. Virtual data simulation logic can include, inter alia, rules which are based on physical principles which define the interaction between physical bodies in the real world.

According to the presently disclosed subject matter, in addition to the virtual data, determination as to whether or not to allow an issued command is also based on graphical information extracted from the synthetic images. Command processing unit 230 is configured to process the synthetic images (e.g. with the help of image processing module 232) and extract from the images various graphic image parameters values characterizing the image.

Command processing unit 230 is further configured to determine, based on the extracted graphic image parameters values, whether the issued command should be allowed or not. To this end, command processing unit 230 can comprise, for example, image processing simulation module 233 configured to obtain image parameters reference values and determine whether a difference between the extracted values and the reference values complies with one or more conditions. Based on the result of the comparison, command processing unit 230 can determine whether or not to allow an issued command. The image processing reference values can be obtained for example, from data repository (250) operatively connected to control unit simulator 220.

The reference values are graphic image processing parameter values extracted from synthetic images which visually resemble real world images in which the real sensing unit (which is being simulated by simulator 200) would have been able to execute the issued command. Reference values are in fact threshold values providing an indication with respect to a certain type of synthetic image (where the type of synthetic image can be defined for example based on the machine which was used for creating the image, including the algorithm and synthetic data which were used in the process) as to whether or not the simulator, when simulating a certain sensing unit, should be capable of executing a certain command. Given a synthetic image, if the graphic parameter values extracted from the image are similar to a respective reference value (e.g. the difference between the two values is smaller than a certain predefined value), this serves to indicate that the command should be allowed, otherwise it serves to indicate that the command should not be allowed. Thus, command processing unit 230 enables to increase the similarity between the operation of the simulator and the operation of the real UAV system being simulated.

FIG. 4 which is described below is a flowchart showing an example of a sequence of operations carried out for the purpose of defining the reference values, according to the presently disclosed subject matter.

In case command processing unit 230 determines that the issued command should not be allowed, execution of the command is denied. In case command processing unit 230 determines that the issued command should be allowed, a respective command is generated (e.g. by command generator 234) and executed by command simulation module 236. Command simulation module 246 can be configured to generate graphical simulation of the command execution in the synthesized images (e.g. tracking the target and displaying on the screen the execution of the command, as would be in a real world scenario).

FIG. 3 is a flowchart illustrating an example of a sequence of operations performed, in accordance with the presently disclosed subject matter. Operations described with reference to FIG. 3 can be executed for example by system 200 described above with reference to FIG. 2.

At block 301 virtual image data of a scene is generated (e.g. with the help of scene generation engine 210). Virtual data can include data object libraries, each data object pertaining to a certain feature in the displayed scene and comprises different fields characterizing the feature (e.g. size of the feature, x,y,z coordinates of feature within the scene, color, texture, is the feature moving or stationary, etc.). The compilation of the data objects provides the information pertaining to a specific scene in a specific environment.

According to some examples, preprogrammed packages, each package comprising multiple virtual data components (e.g. data objects) representing a specific scene can be selected and retrieved from a data-repository in order to obtain a desired training environment. Alternatively or additionally, desired scenarios can be built by selecting various virtual data components (e.g. data objects) from the virtual data libraries.

Following retrieval of the relevant virtual data from the virtual data libraries, the retrieved objects are used for generating (e.g. with the help of image simulation engine 223) synthetic images graphically representing the desired scene (block 303). The images are generated to show the scene from the vantage point of an imaging payload located onboard a UAV. Thus, the content of the images is dependent, inter alia, on the location heading and speed of the UAV with respect to the scene which is currently being simulated, as well as the current angle of view of the simulated imaging payload onboard the UAV. The synthetic images can be generated as a simulated video stream.

Synthetic images are displayed on a displayed device (221) to be viewed by a training operator (block 305). The synthesized image data can include cached image data of an area in the scene which is greater than the area which is being displayed at a given moment (e.g. greater than the FOV of the imaging payload). This enables the UAV system simulator to provide a continuous and smooth flow of synthetic images as the UAV changes position and/or as the operator changes the point of view of the imaging payload and thus provide a more realistic training environment.

The synthetic images are processed in order to extract from the images graphic image parameters values (block 307). Processing of the synthetic images to obtain graphic image parameters can be performed as a standard operation defined as part of the processing flow, irrespective of whether or not a command has been issued. Alternatively, processing of the synthetic images to obtain graphic image parameters values can be performed in response to a command issued by the training operator, in which case operations of block 309 precedes the operations of block 307. Processing of the synthetic images to obtain graphic image parameters values can be executed for example with the help of command processing unit 230 and more specifically with the help of image processing module 232.

The processing can include the transformation of the images into respective bitmaps and processing of the bitmap for extracting values of different graphic image parameters. Graphic image parameters include for example: color values, contrast between different objects in the image and the image background, contrast between different parts of the same image, differences in various graphic image parameters characterizing the same objects in different images along a succession of images, products of edge detection, products of image segmentation, or any other graphic image characteristics known in the art.

The training operator views the displayed images and can issue various commands with respect to objects sighted in the synthetic images. At block 311 the relevant virtual data is processed for determining whether the requested operation can be executed based on the objective environmental conditions (e.g. with the help of virtual data processing module 131). As the synthetic images are the graphical representation of the virtual data, the virtual data contains the needed information for determining whether an issued command can be executed based on the physical and inertial conditions, given the current physical interrelations between the command subjects.

For example, assuming a training operator has issued a lock and track command with respect to a target viewed in the synthetic images, the position of the simulated UAV relative to the position of the simulated target is calculated in order to determine whether there is a sufficiently clear line of sight between the two positions. Only if a sufficiently clear line of sight is identified (i.e. no other objects in the image are blocking the line of sight) the command is allowed. Another example is related to using the target's speed and direction as well as the UAV's speed and direction for determining whether, under these conditions, it is possible to enter track mode (i.e. start tracking the target).

If it is determined that the objective environmental conditions do not allow the execution of the command, execution of the command is denied (block 315). An appropriate indication can be provided to the operator. Otherwise, processing of the command proceeds.

As explained above, successful execution of an issued command depends, in addition to the objective environmental conditions, on the performance capabilities of the specific sensing unit which is being used. In order to provide realistic simulation of the operation of a certain type of sensing unit (comprising a certain type of tracker device), it is desired that the reaction of simulator 200 resembles, as closely as possible, the reaction of the actual sensing unit (and respective tracker device comprising a certain tracking circuit board) which is being simulated, when operating in the real world under the same objective environmental conditions.

According to the presently disclosed subject matter, graphic image parameters values are used in order to adapt the operation of the simulator to more closely resemble the operation of the specific sensing unit which is being simulated. The graphic image parameters values extracted from the synthetic images are used to determine whether or not to allow the simulated execution of an issued command (block 313). Image parameters values extracted from the synthetic images are compared with respective reference values. If the result of the comparison complies with one or more predefined conditions, the issued command is allowed. Various rules defining the conditions are provided as part of the image processing logic stored in a data repository (e.g. 250) operatively connected to control unit simulator 220.

For example, assuming simulator 200 is simulating the operation of a sensing unit comprising a certain type of tracker device, given a certain synthetic image, the contrast value between the target and the image background may be indicative as to whether or not the simulated sensing unit would have been able to identify and track the target, had it been given the same command while processing real world images.

If the contrast between the target and the image background does not comply with the required condition(s) relative to the respective reference values (e.g. a certain contrast threshold value defined by the image processing logic), this indicates that a real tracker device processing a real world image, visually similar to the synthetic image, would not have been able to lock and track the target. If the contrast between the target and the image background does comply with the required condition(s), this indicates that the real tracker device processing a real world image, visually similar to the synthetic image, would have been able to lock and track the target.

The reference values used for analyzing the simulated execution of different commands by a certain sensing unit may not be the same. Thus, each command may be assigned with a respective set of reference values (a set comprising one or more values) specifically selected for determining whether the command can be executed or not. Different sets may differ in the type of graphic image parameters they contain and/or the values of the respective reference values.

Furthermore, as different sensing units (e.g. comprising different tracker devices) may be characterized by different performance, the reference values pertaining to different sensing units may be different as well. Accordingly, each sensing unit may be assigned with respective sets of reference values specifically adapted to simulate its performance, each set directed for the analysis of a different command.

For example, a different contrast threshold value may be assigned to different sensing units. Another example of a reference value is target exposure threshold. Target exposure threshold is another characteristic of the performance capability of a sensing unit. The term "target exposure threshold" as used herein, refers to the part of the target which is required to be exposed to the imaging payload in order to allow the sensing unit to continue and track the target.

For example, while a target is being tracked it may move behind some other object located in the line of sight between the sensing unit and the target. As a result, sight of the target may be partially or completely blocked by the object. Whether or not the sensing unit can continue and track a partially blocked target depends, at least partly, on whether or not the part of the target which remains exposed is greater than the target exposure threshold.

According to an example of the presently disclosed subject matter, image processing can be used in order to retrieve information pertaining to the current target exposure value by comparing the target in the latest image to the target as it appeared in preceding images. Using image processing allows comparing the entire area of the target which is visible in each image instead of relying on the limited information available in the virtual data. Again, this parameter may vary in different sensing units and accordingly different sensing units may operate differently in similar scenarios. Thus, the relevant target exposure threshold value is adapted to the specific values which represent the operation of the simulated sensing unit.

Simulator 200 can be thus adapted to simulate the operation of different UAV systems each using a different sensing unit, by using adequate reference values when simulating each sensing unit.

Furthermore, by changing the reference values, the operational characteristics of a given simulator can be adapted to simulate operation of a UAV in a specifically desired operational environment. For instance, rules defined by the reference values logic can be changed in order to make the training on the simulator harder than the operation of an actual UAV system under real world conditions.

For example, reference values can be adapted to simulate malfunction of the tracking operation and/or the UAV system. These simulations are desirable in order to train operators to control a UAV under these conditions. Malfunction can include for example any one of: inability to enter tracking mode; exiting tracking mode at any given moment; and inability to enter other type of modes including for example prediction mode where a target is lost behind another object in the scene and its future location is predicted based on its last identified progression vector.

Simulation of these malfunctions is made possible due to the flexible and generic structure of the simulator disclosed herein, inter alia, due to the usage of both the virtual data and the image processing data. The reference values can be skewed in order to enable the simulation of UAV system operating under sub-optimal conditions. By increasing or decreasing the reference values, simulator 200 can be adapted to simulate operational conditions in which various operations fail although they are expected to succeed. For example, the contract reference value can be decreased such that a very high contrast between the target and the image background is required to enable tracking. This is because in real world conditions the contrast value which is required is considerably greater (i.e. a lesser degree of contrast is required).

To this end, simulator 200 can be configured to receive input (e.g. from a user interacting with interface 201), for setting simulator 200 to simulate desired operational conditions. According to one example, simulator 200 can include dedicated software (including for example a suitable graphical user interface) enabling a user to determine the desired operational conditions. Responsive to the user input, simulator 200 is configured to adapt the operation of command processing unit 230 to provide the desired simulation. This can be accomplished for example by adapting the reference values and/or the image processing logic to match the required simulation. Furthermore, command processing unit 230 can be configured to operate using both reference value simulating proper operation of the UAV system and reference value simulating defective operation of the UAV system. Command processing unit 230 can be configured to occasionally switch between the different types of reference values and thus provide a more realistic simulation of a malfunctioning UAV system.

The decision as to whether or not allow a given command may depend on two or more graphic image parameters values. For example, the execution of a lock and track command may be allowed only if the values of both the contrast and color of the target are within a certain difference from respective contrast reference value and color reference value. Additionally or alternatively, execution of a certain command may be allowed only if at least n out of m (e.g. 2 out of 3) specific image graphic image parameters comply with the specified conditions defined by the image processing logic.

If it is determined, based on the extracted data parameters, that the issued command should be allowed, command execution is simulated (block 317). For example, command simulation module 246 can be configured to simulate the tracking operation which provides appropriate images of the target. Otherwise, if it is determined, based on the extracted data parameters, that the issued command should be allowed, the command is denied. An appropriate indication can be provided to the operator.

The operations described with reference to blocks 311 and 313 are repeated while the command is being executed in order to determine whether any changes in the images do not allow further execution of the command. For example, while tracking a target, it is continuously determined whether changes in the images render further tracking of the target to be not possible. For instance, in case the target has moved behind another object which blocks the line of sight to target. Or in case the target has moved to an area where the contrast between the target and the background does not comply with the respective conditions specified in image processing logic.

FIG. 4 is an example of a sequence of operations performed for the purpose of determining graphic image parameter reference values, according to the presently disclosed subject matter. Operations described with reference to FIG. 4 can be executed for example with the help of reference values determination module 236. Alternatively, operations described with reference to FIG. 4 can be performed by a different computerized device with appropriate computer processing capabilities. Operations described with reference to FIG. 4 can be executed asynchronously to the operations described above with reference to FIG. 3.

At block 401 it is determined whether, given a certain synthetic image, a specific simulated sensing unit would have been able to execute a certain command, had the command been given with respect to a real world image which is visually similar to the synthetic image. This process is based on the premise that if the synthetic image is visually similar to a real world image in which the command in question would have been executed by the sensing unit which is being simulated, then the same command should be also executed by a simulator if provided with respect to the synthetic image.

Determining that the synthetic image is visually similar to a real world image which would render the execution of the command possible, can be done by a trained operator who is familiar with operation of the simulated sensing unit and can determine (or at least estimate) whether or not the command in question would have been allowed or not. The same synthesized images can be presented to many trained operators in order to receive an answer which is based on the opinion of a plurality of operators. This can be repeated with many different synthetic images.

Alternatively, or additionally, determining that the synthetic image is visually similar to a real world image which would render the execution of the command possible can be done by a computerized processing device configured for this purpose.

If the answer to the above enquiry is positive, the process proceeds to extract, from the synthetic image, graphic image parameter values which characterize the image (block 403). Alternatively or additionally, also in case the answer is negative the process proceeds to extract, from the synthetic image, graphic image parameter values which characterize the image in order to determine graphic image parameter values which are indicative that the command cannot be executed.

Reference values are determined based on the graphic image parameters values extracted from the synthetic images which were analyzed (block 405). These reference values serve as indicators of synthetic images in which the same or similar commands should be allowed to be executed. The reference graphic image parameters values are stored in a data repository to be used during simulation (block 407).

In order to determine reference values adequate for the analysis of different commands, the synthetic images can be repeatedly analyzed, each time for obtaining reference values for analyzing the capability to execute a different command.

Furthermore, in order to obtain reference values suitable for the simulation of different sensing units, the process can be repeated each time when analyzing synthetic images based on the expected performance of a different sensing unit.

The image processing logic is also determined and stored. Image processing logic defines the rules determining under which conditions the comparison between the graphical image parameters extracted from synthetic images during simulation and the reference values is indicative that an issued command can be executed.

For example, a reference value can be provided as a range of values (tolerance range), where extracted graphic image parameter values which fall within that range are considered valid (i.e. indicative that the command can be executed). If, during the determination process of a reference value, different graphic image parameters are determined as valid (e.g. during the determination process different operators provide different values), a reference value based on the plurality of difference graphical image parameters can be calculated (e.g. by averaging the difference values and using n times the standard deviation for providing a tolerance range).

It is to be understood that the system according to the presently disclosed subject matter may be a suitably programmed computer. Likewise, the presently disclosed subject matter contemplates a non-transitory computer program being readable by a computer for executing the method of the presently disclosed subject matter. The presently disclosed subject matter further contemplates a machine-readable memory (transitory and non-transitory) tangibly embodying a program of instructions executable by the machine for executing the method of the presently disclosed subject matter.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A computerized method of simulating a real unmanned vehicle ("UxV") system including a sensing unit operating onboard a UxV configured to communicate over a communication link with a control unit, the method comprising:
   using a computer processing device operatively connected to a display device for:
      displaying synthetic images on the display device, the synthetic images showing an artificial representation of an environment in which operation of a UxV is being simulated, the synthetic images are shown as if viewed from a vantage point of an imaging payload located onboard the UxV;
      processing the synthetic images to extract therefrom values of one or more graphic image parameters;
      responsive to a command issued with respect to the synthetic images, comparing the extracted values with respective predefined reference values; wherein the predefined reference values are graphic image parameters values extracted from synthetic images that provide an indication with respect to the synthetic images, as to whether or not execution of the command should be allowed by the simulator, when simulating a certain sensing unit; and
      simulating execution of the issued command only if the comparison between the extracted values and respective reference values complies with at least one predefined condition, thereby increasing similarity between the simulation of an execution of a command and the execution of the command by the real UAV system being simulated.

2. The computerized method according to claim 1, further comprising determining whether to allow execution of the command based also on virtual data that defines the physical characteristics of the synthetic images.

3. The computerized method according to claim 1, further comprising adapting the predefined reference values according to performance capabilities of the real sensing unit in order to realistically simulate the operation of the real sensing unit.

4. The computerized method according to claim 1, further comprising adapting the predefined reference values according to performance capabilities of another real sensing unit that is characterized by performance capability that is different than the real sensing unit, in order to realistically simulate the operation of the another sensing unit.

5. The computerized method according to claim 1, further comprising adapting the predefined reference values to match malfunctioning performance of the real sensing unit in order to simulate a defective UxV system and/or defective sensing unit.

6. The computerized method according to claim 1, wherein the command is directed for tracking a target displayed in the synthetic images.

7. The computerized method according to claim 1, wherein the graphic image parameter values include one or more of:
   contrast value indicating the difference between the target and the background image; color values;
   differences in various graphic image parameters characterizing the same objects in different images along a succession of images;

products of edge detection; or products of image segmentation.

8. The computerized method according to claim 1, further comprising:

generating synthetic images based on virtual data that defines the physical characteristics of the synthetic images.

9. The computerized method according to claim 1, wherein the UxV includes a unmanned aerial vehicle.

10. A unmanned vehicle ("UxV") system simulator of a real UxV system comprising a sensing unit operating onboard a UxV configured to communicate over a communication link with a control unit, the UxV system simulator comprising:

a computer processing device operatively connected to a display device, the processing device being configured to:

display synthetic images on the display device, the synthetic images showing an artificial representation of an environment in which operation of a UxV is being simulated, the images are shown as if viewed from a vantage point of an imaging payload. located onboard the UxV;

process the synthetic images to extract herefrom values of one or more graphic image parameters;

responsive to a command issued with respect to the synthetic images, comparing the extracted values with respective predefined reference values; wherein the predefined reference values are graphic image parameters values extracted from synthetic images that provide an indication with respect to the synthetic images, as to whether or not execution of the command should be allowed by the simulator, when simulating a certain sensing unit; and simulate execution of the issued command only if the comparison between the extracted values and respective predefined reference values complies with at least one predefined condition, thereby increasing similarity between the simulation of an execution of a command by the simulator and the execution of the command by the real UAV system being simulated.

11. The UxV system simulator according to claim 10 wherein the computer processing device is further configured to determine whether to allow execution of the command based also on virtual data that defines the physical characteristics of the synthetic images.

12. The UxV system simulator according to claim 10 wherein the computer processing device is further configured to adapt the predefined reference values according to performance capabilities of the real sensing unit in order to realistically simulate the operation of the real sensing unit.

13. The UxV system simulator according to claim 10 wherein the computer processing device is further configured to adapt the predefined reference values according to performance capabilities of another real sensing unit that is characterized by performance capability that is different than the real sensing unit, in order to realistically simulate the operation of the another sensing unit.

14. The UxV system simulator according to claim 10 wherein the computer processing device is further configured to adapt the predefined reference values to match malfunctioning performance of the real sensing unit in order to simulate a defective UxV system and/or defective sensing unit.

15. The UxV system simulator according to claim 10, wherein the command is directed for tracking a target displayed in the synthetic images.

16. The UxV system simulator according to claim 10, wherein the graphic image parameter values include one or more of:

contrast value indicating the difference between the target and the background image; color values;

differences in various graphic image parameters characterizing the same objects in different images along a succession of images;

products of edge detection; or products of image segmentation.

17. The UxV system simulator according to claim 10, wherein the computer processing device is further configured to: generate synthetic images based on virtual data that defines the physical characteristics of the synthetic images.

18. The UxV system simulator according to claim 10, wherein the UxV includes a unmanned aerial vehicle.

19. A computer-readable non-transitory memory device tangibly embodying a program of instructions executable by the computer for executing a method of simulating a real unmanned vehicle ("UxV") system including a sensing unit operating onboard a UxV configured to communicate over a communication link with a control unit, the method comprising:

using a computer processing device operatively connected to a display device for:

displaying synthetic images on the display device, the synthetic images showing an artificial representation of an environment in which operation of a UxV is being simulated, the images are shown as if viewed from a vantage point of an imaging payload located onboard the UxV;

processing the synthetic images to extract therefrom values of one or more graphic image parameters;

responsive to a command issued with respect to the synthetic images, comparing the extracted values with respective predefined reference values; wherein the predefined reference values are graphic image parameters values extracted from synthetic images that provide an indication with respect to the synthetic images, as to whether or not execution of the command should be allowed by the simulator, when simulating a certain sensing unit; and simulating execution of the issued command only if the comparison between the extracted values and respective predefined reference values complies with at least one predefined condition, thereby increasing similarity between the simulation of an execution of a command and the of the execution of the command by the real UAV system being simulated.

* * * * *